United States Patent [19]

Schiedegger et al.

[11] Patent Number: 4,524,096
[45] Date of Patent: Jun. 18, 1985

[54] HEAT BONDED COMPOSITE PLASTIC ARTICLE AND METHOD AND APPARATUS FOR MAKING SAME

[75] Inventors: Charles E. Schiedegger, Metamora; Vean Elfes, Lapeer, both of Mich.

[73] Assignee: Metamora Products Corp., Metamora, Mich.

[21] Appl. No.: 555,046

[22] Filed: Nov. 25, 1983

[51] Int. Cl.³ .................. B32B 3/02; B32B 27/04; B32B 5/14; B32B 5/32
[52] U.S. Cl. ......................................... 428/68; 428/76; 428/157; 428/160; 428/162; 428/198; 428/316.6
[58] Field of Search ............ 428/159, 160, 198, 316.6, 428/319.7, 319.9, 68, 76, 161, 162, 163, 157

[56] References Cited

U.S. PATENT DOCUMENTS 3,499,848  3/1970  Weisman ........................ 428/317.9
3,528,866  9/1970  Stevens ......................... 428/319.7

Primary Examiner—William J. Van Balen
Attorney, Agent, or Firm—Krass & Young

[57] ABSTRACT

A heat bonded composite plastic article comprises a sheet of solid thermoplastic material such as polypropylene an envelope or jacket of urethane foam, the jacket of foam being heat staked directly to the thermoplastic material in a plurality of adjacent but discontinuous locations characterized by permanent compression of the foam and welding of the solid thermoplastic material into the foam, the areas in the opposite faces of the article being in substantially exact registration with one another. The apparatus for producing the article comprises a press like combination of heated platens mounted on pivot arms which are operated by air cylinders, each of the platens having stakes which perform the compression and welding functions described above. In addition, one of the platens preferably carries a knife edge to trim the urethane foam around the periphery of the solid plastic body. An assembly method using a semi-automated apparatus is disclosed.

7 Claims, 10 Drawing Figures

Fig-3
- PLACE FOAM ON WIRE BRACKET FIG-4
- PLACE DOOR OVER FOAM FIG-5
- FOLD FOAM OVER PIN AGAIN FIG-6
- SEAL AND CUT FIG-7
- REMOVE AND TRIM
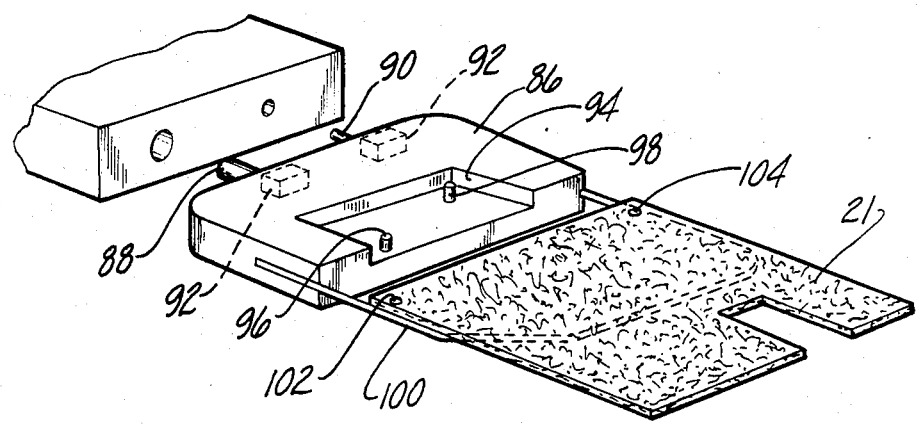
Fig-4
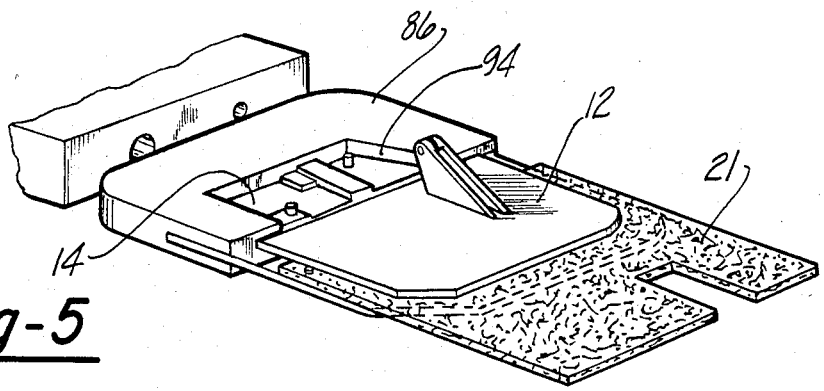
Fig-5

HEAT BONDED COMPOSITE PLASTIC ARTICLE AND METHOD AND APPARATUS FOR MAKING SAME

INTRODUCTION

This invention relates to composite plastic articles of manufacture and to a method and apparatus for making such articles.

BACKGROUND OF THE INVENTION

Cellular plastic foam material such as urethane is often used as a sealing material by attachment of urethane sheet to structural members which are typically made of metal such as steel. An example is an automobile heater bypass door, a fabricated product which includes a metal plate having urethane foam bonded to the opposite faces thereof and a plastic bracket which is riveted to the metal plate to provide a mounting structure as well as a crank connector bracket for moving the door between operative positions.

It is highly desirable from the standpoint of cost and weight savings to replace the metal plate with plastic; i.e., essentially to integrate the metal with the current plastic mounting bracket in not only the above described heater bypass door but in many other products which use plastic foams as a sealing material. However, this means bonding the foam to the plastic structural element. When that structural element is made of polypropylene or certain related rigid plastics, it is difficult or impossible to achieve a satisfactory bond between the plastic and the urethane foam. Accordingly, the metal-plastic composite approach continues to predominate.

SUMMARY OF THE INVENTION

In accordance with the present invention a heater bypass door or any of a wide variety of other components typically made as a composite of steel and urethane foam may now be fabricated substantially exclusively of plastic by heat bonding or welding of the urethane foam directly to the underlying the rigid plastic structural element thereby eliminating the need for a steel structural element to which the urethane foam has been previously bonded. This results in a substantial savings in cost due to the elimination of the steel and the elimination of the process step of assembling the steel element with associated plastic elements.

Therefore a first aspect of the invention is the article itself which may be described as a heat bonded composite plastic article comprising the combination of the sheet-like structural element of solid thermoplastic material such as polypropylene and at least one layer of cellular plastic foam material such as urethane disposed on a surface of the structural element and being bonded or welded to the structural element in a plurality of mutually discontinuous areas characterized by permanent compression of the foam and a welding of the solid thermoplastic material into the foam.

In accordance with a second aspect of the invention, a method for manufacturing composite plastic articles of the type having a urethane foam sealing layer is provided. In general, the method comprises the steps of overlying a structural element of solid thermoplastic material such as polypropylene with at least one layer of cellular plastic foam material such as urethane, compressing the urethane foam material against the solid thermoplastic material in a plurality of mutually discontinuous areas and simultaneously heating the underlying thermoplastic material in the area of the compression to fuse or melt the thermoplastic material into the compressed foam.

In accordance with a third aspect of the invention an apparatus for producing composite plastic articles of the type having a thermoplastic structural body and at least one layer of cellular plastic material such as urethane foam is provided. In general the apparatus comprises a support structure for holding a rigid thermoplastic body and at least one sheet of cellular plastic in juxtaposed but unjoined relationship and press means for clamping the two plastic elements together, the press means having at least one platen which causes simultaneous compression of the urethane foam in a plurality of discontinuous areas and heating of the underlying rigid plastic material sufficient to cause melting thereof into the foam in the areas of compression.

Additional features and advantages of the invention according to the various aspects thereof will be apparent from a reading and understanding of the following detailed specification.

BRIEF DESCRIPTION OF THE DRAWING

FIG. 3 is a process flow chart for making the door of FIG. 1 or any similar article;

FIG. 4 is a perspective view of part of the apparatus used to carry out the process of FIG. 3 and in a first stage of the process;

FIG. 5 is a perspective view of part of the apparatus used to carry out the process of FIG. 3 and in a second stage of the process;

DETAILED DESCRIPTION OF THE SPECIFIC EMBODIMENT

Figure 1:
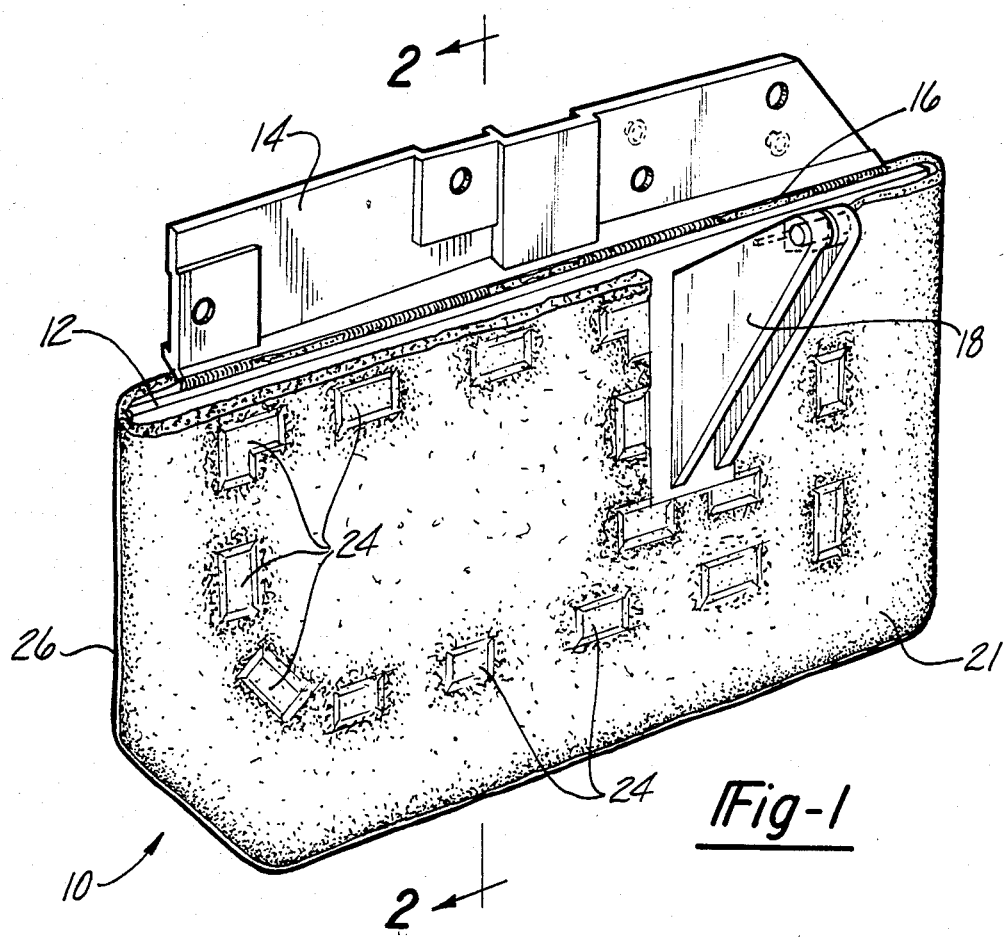
FIG. 1 is a perspective view of a heater bypass door constructed in accordance with the invention.
Figure 2:
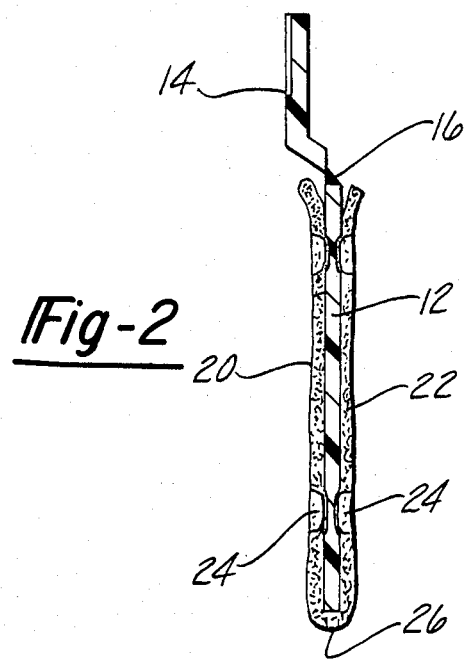
FIG. 2 is a section through the door of FIG. 1.

Referring to the drawing and particularly to FIGS. 1 and 2 there is shown a composite plastic article of manufacture 10, in this case a heater bypass door, comprising a plate 12 of generally rectangular sheet-like configuration and made of solid thermoplastic material such as polypropylene having an integral mounting bracket 14 connected thereto by "living" hinge areas 16. Article 10 further comprises a crank connector bracket 18 which permits the article 10 to be connected to a push-pull crank mechanism to swing the article 10 back and forth between operating positions. Article 10 further comprises a urethane foam sealing jacket 21 having layers 20 and 22 on opposite plane faces of the solid plastic plate 12, the urethane foam layers 20 and 22 being heat-staked through the thermoplastic plate 12 in a plurality of mutually discontinuous areas 24 which are characterized by permanent compression of the urethane foam and a welding of the thermoplastic material from plate 12 into the compressed foam. Layers 20 and 22 are further bonded together at a peripheral seam 26 which extends essentially around three sides of the article 10.

It is to be understood that the heater bypass door is but a single example of an article which may be manufactured according to the teachings of the present invention, there being a wide variety of manufactured articles which may be assembled from a structural element of solid thermoplastic materials and one or more sealing layers of urethane foam which is bonded to the structural component.

Figure 10:
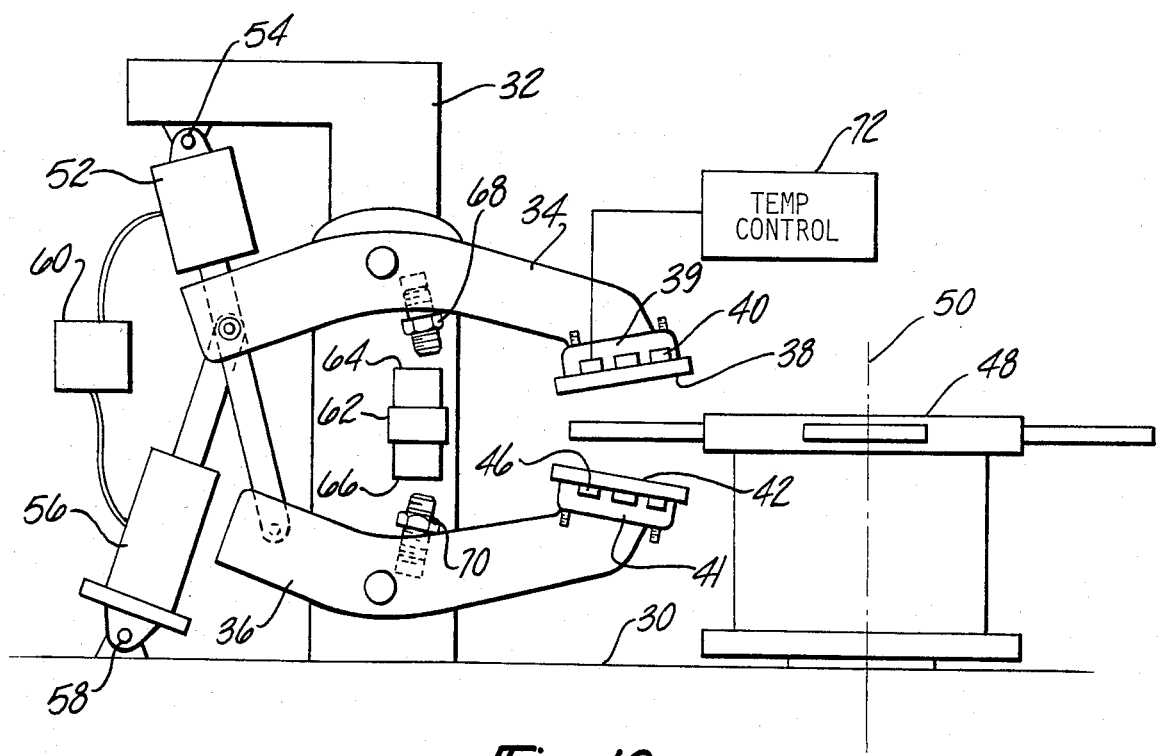
FIG. 10 is a side view of a press used in conjunction with the apparatus of FIG. 9 for making articles according to the present invention.

Referring now to the drawing, and particularly to FIGS. 3 through 10, an apparatus and a method of using the apparatus to manufacture the article 10 and/or similar articles will be described. As shown in FIG. 10, the apparatus comprises a table 30 defining a work station and having a vertical support post 32 of structural steel and carrying two pivotally mounted press arms 34 and 36. Arm 34 carries at the inboard end a platen 38 of aluminum or brass mounted on a backplate 39 which is preferably machined out of aluminum and which has inserted therein a plurality of electric heater cartridges 40. The platen 38 and the backplate 39 may be mounted on the arm 34 for angular and positional adjustment as will be apparent to those skilled in the art. Arm 36 carries a bottom platen 42 mounted on an aluminum backplate 41 which has disposed therein a plurality of electric heater cartridges 46. The bottom platen 42 is adjustable in the same manner as the upper platen 38.

The arms 34 and 36 are located so that a pivoting motion which causes the platens 38 and 42 to approach one another is effective to clamp preassembled but unwelded articles 10 at one of several positions of a rotary loader/unloader 48 which is mounted on table 30 for motorized, preferably automated, rotation about axis 50. In the illustrated embodiment there are four work stations or work positions and accordingly each rotation of loader/unloader 48 and 90 degrees.

Upper arm 34 is connected to an air cylinder 52 which is pivotally mounted to the table 30 at 54. Arm 36 is connected to an air cylinder 56 which is pivotally mounted to a table structure 30 at 58. A control system comprising timers, switches and the like is shown at 60 to be connected to the air cylinders 52 and 56 to cause them to operate in substantially synchronized fashion as hereinafter described in greater detail.

Post 32 carries a positive mechanical stop element 62 having upper and lower faces 64 and 66 to provide an adjustable positive mechanical stop for the arms 34 and 36 as they pivot in such a fashion as to bring the platens 38 and 42 together. Surface 64 on element 62 cooperates with a threaded stud 68 in arm 34 to provide the first of the aforementioned positive stops and surface 66 cooperates with a threaded stud 70 located in the arm 36 to provide the second of the aforementioned mechanical stops. Temperature control 72 including suitable thermostats and electrical control elements is provided maintaining the temperatures of the platens 38 and 42 by way of the electric heater cartridges 40 and 46.

Figure 8:
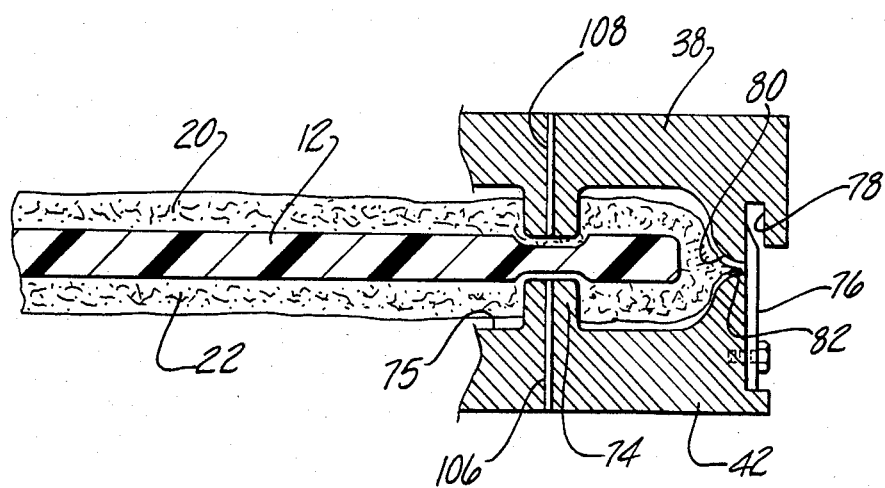
FIG. 8 is a sectional view of the door of FIG. 1 undergoing a heat-staking or welding step.
Figure 9:
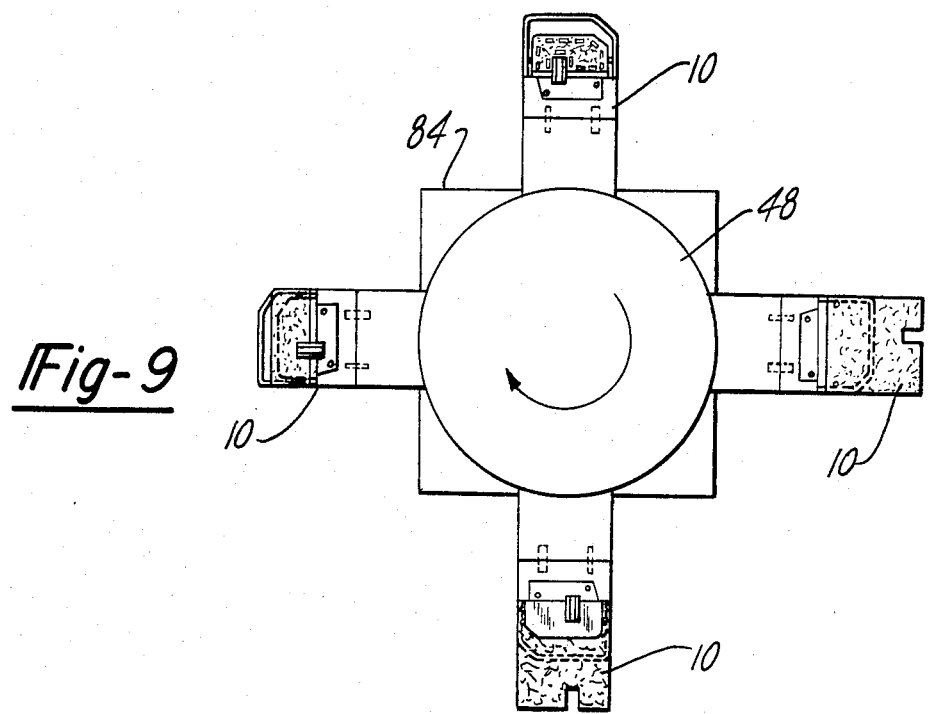
FIG. 9 is a plan view of a continuous-process apparatus for making articles according to the invention.

Referring now to FIG. 8 the details of the top and bottom platens 38 and 42 are illustrated in greater detail. The platen 42 comprises a pattern of discontinuous stakes 74 following the pattern of the compressed areas 24 of the article 10 as shown in FIGS. 1 and 2. Each of the stakes 74 is raised above the surface 75 by a dimension sufficient to leave the majority of urethane foam layers 20 and 22 uncompressed while the stakes 74 of the complemental platens 38 and 42 are moved toward one another in registration with one another until the gap between the stakes 74 of the upper and lower platens is about 0.020 inches less than the total thickness of the thermoplastic body 12; i.e., the stakes 74 actually melt into the thermoplastic plate 12 after compressing the urethane foam.

Platen 42 further comprises a replaceable rule die knife edge 76 which cuts and trims the urethane foam layers to the desired configuration as hereinafter described. As best shown in FIG. 8 the knife edge 76 and the lower platen 42 cooperates with a slot 78 which is machined into the upper platen 38 to perform a slicing action which trims away the excess urethane foam. Heated surfaces 80 and 82 of platens 38 and 42 respectively are inboard of the slicing action produced by the knife edge 76 and slot 78 and act to compress and fuse together the urethane foam around the periphery of the article 10 to essentially jacket the solid thermoplastic plate 12 around three sides as mentioned above. It will be understood that the slicing and sealing action can take place around the entirety of the periphery of an article having a different configuration and a different end use from the article 10 shown in FIGS. 1 and 2.

Referring back to FIG. 8 it will be appreciated that the upper and lower platens 38 and 42 of the apparatus shown in FIG. 10 have mirror-image patterns of heat stakes 74 and further that the platens are adjusted in location so that the stakes 74 and the depressions 24 in the urethane foam are in substantially exact registration, although reversely similar in entry orientation. As shown in FIG. 8 the stakes 74 compress the foam and actually cause a material flow which permits penetration of about 0.010 inch of each stake into the material of the plate 12. Vents 106 and 108 are formed in the stakes 74 of the platens 38 and 42 to release air from the compressed foam areas. In addition the stakes 74 are smoothly radiused by filing and polishing on all of the edges so that no cutting or severing action takes place as the stakes compress the urethane foam layers 20 and 22. Each platen is preferably Teflon-coated after it has been machined to the proper configuration and polished as aforesaid.

Referring now to FIGS. 3 through 7 additional details of the loader/unloader 48 and the assembly process will be described. The loader/unloader 48 comprises a rotary hub-plate 84 which is essentially square in configuration and, therefore, exhibits four flat sides each of which is configured to receive an identical work support structure hereinafter described with reference to only one such structure. Each work support structure comprises a machined metal plate 86 having two pins 88 and 90 projecting from an edge thereof and adapted to fit within machined sockets within the hub 84 and entering in one of the aforementioned flat sides. Magnets 92 lock the support structure 86 to the steel hub plate when in position but permit easy removal for modification due to a change of parts, etc. The structure 86 has a pocket 94 machined out to receive the mounting bracket 14 of the article 10. Pins 96 and 98 in the pocket 94 are received in holes in bracket 14 and locate the part in a proper position for the clamping and welding function to be performed between platens 38 and 42 at a later position of the hub-plate 84. A wire 100 extends from the structure 86 to provide a closed loop for support of the urethane while the composite plastic materials are being assembled. Locator pins 102 and 104 mounted on wire 100 are received in pin holes which are cut into the urethane foam sheets prior to the assembly.

Figure 6:
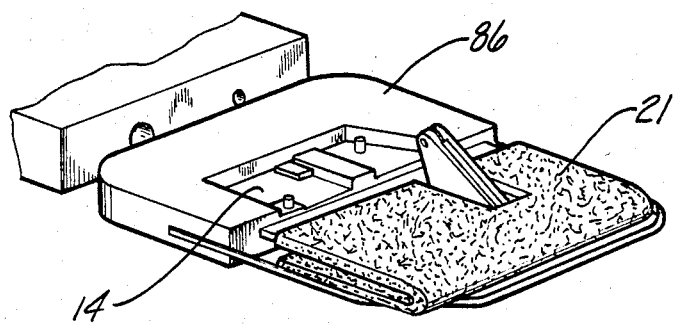
FIG. 6 is a perspective view of part of the apparatus used to carry out the process of FIG. 3 and in a third stage of the process.
Figure 7:
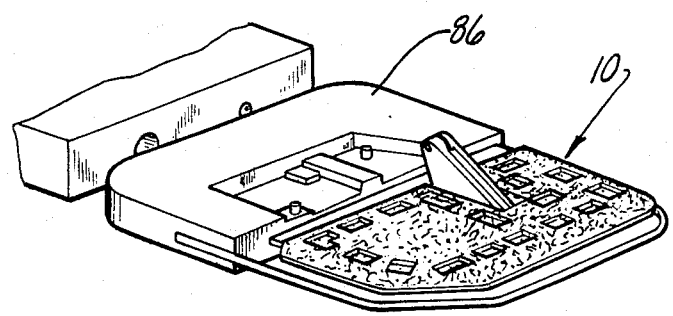
FIG. 7 is a perspective view of part of the apparatus used to carry out the process of FIG. 3 and in a fourth stage of the process.

The assembly process is essentially as follows. First a sheet of urethane foam is located on the pins 102 and 104 and of the wire 100 (FIG. 4). The plate 12 is thereafter placed on top of the urethane foam sheet 21 and located by means of pins 96 and 98 (FIG. 4). The single urethane foam sheet 21 is then folded over and the pinholes in the lower edge are secured over the pins 102 and 104 (FIG. 6). The hub-plate 84 is then rotated until the assembly just described is between the platens 38 and 42. Control 60 is operated so as to close the platens against one another to the configuration or position essentially shown in FIG. 8 so as to trim and weld the urethane foam to itself around the outside of the plate 12 and to heat stake the urethane foam to the plate in the plurality of mutually discontinuous locations represented by the depressions 24 in the article 10 as shown in FIGS. 1 and 2.

In the preferred embodiment described herein the lower platen is operated at a temperature of about 435 degrees F. and the upper platen is operated at about 450 degrees F. Arms 34 and 36 are programmed so that the lower platen reaches the stop position represented by contact between stud 70 and surface 66 just prior to the upper platen 38 reaching its stop position thereby to prevent any scrubing action of the knife edge 76.

We claim:

1. A heat-bonded rigid composite plastic article comprising a rigid body of solid thermoplastic material and a layer of flexible cellular plastic foam material disposed over the body of rigid thermoplastic material, said rigid body and said flexible layer being bonded together in a plurality of mutually discontinuous areas characterized by a permanent compression of the foam material, melting of the solid thermoplastic material of said rigid body in said discontinuous areas, and welding of the melted thermoplastic material of said rigid body into said foam to form a fused, rigid bond between said rigid thermoplastic body and said flexible foam layer.

2. An article as defined in claim 1 wherein said body is sheet-like and exhibits first and second opposite plane faces; said composite article further includes a second layer of cellular plastic foam material; said first and second layers are disposed on the opposite plane faces of said body; each of said layers is bonded together with said body in a plurality of mutually discontinuous areas characterized by permanent compression of the foam, melting of the thermoplastic material of said solid body in said discontinuous areas, and welding of the melted thermoplastic material of said rigid body into said foam to form a fused, rigid bond between the rigid thermoplastic body and the flexible layer of foam; and said areas are reversely similar in orientation but in substantially exact registration as between the two layers.

3. A heat bonded rigid composite plastic article comprising a rigid plate of solid thermoplastic material and a flexible layer of cellular plastic foam material disposed over said rigid plate, said rigid plate and said flexible layer being bonded together in a plurality of mutually discontinuous areas characterized by a permanent compression of the foam, melting of the thermoplastic material of said rigid plate in said discontinuous areas to locally reduce the thickness of the plate, and welding of the melted thermoplastic material of said rigid plate into said foam to form a fused, rigid bond between the rigid plate and the flexible layer of foam.

4. An article as defined in claim 3 wherein said article further includes a second layer of flexible cellular plastic foam material;
    said first and second layers of said flexible cellular plastic foam material are disposed on the opposite sides of said plate;
    each of said layers is bonded to the respective side of said plate in a plurality of mutually discontinuous areas characterized by permanent compression of the foam, melting of the thermoplastic material of said rigid plate in said discontinuous areas to locally reduce the plate thickness, and welding of the melted thermoplastic material of the rigid plate into the foam to form a fused, rigid bond between the plate and the respective foam layer; and
    said discontinous areas are reversely similar in orientation but in substantially exact registration as between the two flexible layers.

5. An article as defined in claim 4 wherein said foam layers are welded together around the outside of said plate of solid thermoplastic material.

6. An article as defined in claim 4 wherein the foam material is urethane and the solid thermoplastic material is polypropylene.

7. An article as defined in claim 4 wherein said plate comprises a door having an integral mounting bracket joined therewith by a "living" hinge.

* * * * *